United States Patent [19]

Cutter et al.

[11] Patent Number: 4,983,668
[45] Date of Patent: Jan. 8, 1991

[54] POLYMER PARTCULATES FOR MOLDING AND THE LIKE

[75] Inventors: Louis A. Cutter, Allegheny, Pa.; Richard A. Ganger, Carmel Valley, Calif.; John J. Godfrey, Murrysville, Pa.

[73] Assignee: Aristech Chemical Corporation, Pittsburgh, Pa.

[21] Appl. No.: 125,316

[22] Filed: Nov. 25, 1987

[51] Int. Cl.$^5$ .................. C08G 63/91; C08L 67/06; C08F 2/20
[52] U.S. Cl. ............................... 525/23; 525/40; 523/501; 526/319; 526/199
[58] Field of Search ............... 525/23, 40; 526/199, 526/319; 523/501, 464; 162/8

[56] References Cited

U.S. PATENT DOCUMENTS

| | | | |
|---|---|---|---|
| 2,443,735 | 6/1943 | Kropa | 260/45.4 |
| 2,594,913 | 4/1952 | Grim | 260/93.5 |
| 2,652,382 | 9/1953 | Hohenstein | 260/86.7 |
| 2,673,194 | 3/1954 | Grim | 260/93.5 |
| 2,833,754 | 5/1958 | Richards et al. | 260/92.8 |
| 3,026,308 | 3/1962 | Kearney | 260/92.8 |
| 3,631,014 | 12/1971 | Wright | 260/93.5 |
| 3,649,610 | 3/1972 | Wright | 260/93.5 |
| 3,755,282 | 8/1973 | Wright | 260/93.5 |
| 3,880,950 | 4/1975 | Hara et al. | 260/862 |
| 4,048,257 | 9/1977 | Stevenson | 260/862 |
| 4,049,749 | 9/1977 | Thorpe | 260/862 |
| 4,147,688 | 4/1979 | Makhlouf et al. | 260/33.6 |
| 4,154,871 | 5/1979 | White | 427/27 |
| 4,170,699 | 10/1979 | Wright | 526/215 |
| 4,172,776 | 10/1979 | Singelyn | 204/159.22 |
| 4,271,283 | 6/1981 | Puhk | 526/317 |
| 4,273,831 | 6/1981 | Singelyn | 428/402 |
| 4,333,969 | 6/1982 | Wright et al. | 427/222 |
| 4,398,003 | 8/1983 | Irwin | 525/531 |
| 4,548,990 | 10/1985 | Mueller et al. | 825/123 |
| 4,569,966 | 2/1986 | Piccirilli et al. | 524/589 |

*Primary Examiner*—Marion C. McCamish
*Assistant Examiner*—Susan Berman
*Attorney, Agent, or Firm*—William L. Krayer

[57] ABSTRACT

Particle size, swelling, and other characteristics of unsaturated polyester beads are controlled in a suspension polymerization system to make beads suitable for use as fillers in molding and forming. Process steps include degassing prior to polymerization, positive pressure during polymerization, and washing to remove suspending agent.

21 Claims, No Drawings

POLYMER PARTCULATES FOR MOLDING AND THE LIKE

TECHNICAL FIELD

This invention relates to the manufacture of polyester beads suitable for use as fillers in polymeric matrices in making molded and otherwise formed plastic products. In particular, it relates to processes for the manufacture of such beads, controlled to assure that they are of a relatively small size and otherwise suitable for use in formed products.

BACKGROUND ART

Most commercial synthetic marble, synthetic onyx, synthetic granite and the like has been heretofore made with inorganic particulate filler in a resin matrix. The inorganic filler is usually a finely ground aluminum trihydrate, calcium carbonate or the like which has an angular surface due to the process of grinding. See, for example, U.S. Pat. Nos. 3,396,067, 3,433,860, 3,773,886, and 4,343,752. Polyester resin filler has also been used, also in ground form, such as in U.S. Pat. Nos. 2,987,496, UK Patent No. 1,174,952 to Majnoni, U.S. Pat. Nos. 3,966,669, 4,159,301 (col. 6, lines 29–43), and 4,137,215.

Prior to the present invention, it has been known to make polymer beads, and particularly unsaturated polyester beads, in a suspension process. E. R. Kolodny in U.S. Pat. No. 3,089,542, and E. L. Kropa in U.S. Pat. No. 2,443,735 disclose methods for preparing polyester beads in suspension; Buzbee and Lake, U.S. Pat. No. 3,823,202, discuss some of the important variables to control in the preparation of clear polymer beads. They disclose the addition of salts to the suspension mixture to improve the clarity and reflectivity of the beads (see also Buzbee and Hite U.S. Pat. No. 3,877,787). M. Narkis, J. Appl. Polymer Sci. 23, 2043–2048, (1979), discusses some of the operational variables in making such polyester beads by suspension polymerization. Spherical resins are also described in U.S. Pat. Nos. 3,929,685, 3,989,775, and 4,398,003.

Various suspending media have been proposed see U.S. Pat. Nos. 3,986,992 (Re. No. 29,555) and 4,025,484. U.S. Pat. No. 3,707,585 employs an acrylamide/acrylic acid ester. However, prior workers in the art have not directed their attention to the need for controlled particle size (however, see U.S. Pat. No. 3,728,318 which strives for uniformity) while also minimizing or eliminating, as far as possible, the incidence of hollow beads, enhancing the ability of the beads to adhere to a matrix throughout the stress of cure, and still provide an efficient suspension process.

SUMMARY OF THE INVENTION

A spherical resinous filler particle offers significant advantages in the molding or other forming of plastic articles, in that the viscosity of a liquid resin-particulate mixture is lower than that of a similar suspension of irregular polyhedral particles such as are made by grinding a hardened mass. A reduced viscosity in turn makes possible an increased loading of the filler in the molding or casting mixture. Increasing the particulate loading makes it possible to reduce the temperature rise occurring with any given exothermic polymerization curing reaction used to produce the final formed plastic piece, and to reduce the shrinkage in the final polymerization operation, thus providing significantly better control over the molding process.

Spherical particles for this purpose are advantageously made by suspension polymerization, according to the present invention.

The invention provides a process for making solid unsaturated polyester beads for use as a filler in the molding or other forming of plastic articles. In the forming process, the solid beads are mixed with a polymerizable liquid to make a suspension of beads in a liquid matrix to be molded or formed in the desired shape, and then the polymerizable liquid is polymerized into a solid matrix resin surrounding the beads. The beads may be, but do not have to be, of the same chemical composition as the matrix; they may be significantly harder or softer (Cf. Ross and Stevens U.S. Pat. Nos. 4,433,070 and 4,544,584). It is desirable that the beads adhere well to the cured matrix, and that they not be excessively swelled by the polymerizable liquid used to make the matrix. The bead-matrix mixture should remain flowable during the forming operation with a sufficient concentration of beads to satisfy the objectives of control of shrink and limitation of the exothermic heat of reaction.

Swelling index is a measure of pick-up of solvent, wherein the beads are immersed in the solvent, separated from it, and then weighed. Toluene is used in our test. A swelling index of 1 means that the beads have absorbed their own weight in toluene. In practice, swelling of the beads is caused by absorption of the matrix liquid, principally styrene monomer.

There is a desirable range of swelling in which good adhesion to the matrix occurs without excessive increase in viscosity; a swelling index of from about 1.0 to about 3 is useful, preferably from about 2.0 to about 3.0. The swelling index may be controlled in the desired range by selection of the polyester resin.

Increasing fumarate (maleic) content in the resin increases the number of sites available for cross-linking and decreases the swelling index of the resulting polymer beads. Likewise, with a resin of given fumarate content (maleic is converted to fumarate as it polymerizes), increasing the relative amount of sytrene used to cross-link the resin increases the swelling index.

The average bead size and its distribution also affect the flowability of bead-matrix liquid mixtures. Very small beads tend to increase the viscosity of the bead-matrix mixture, as does a very uniform particle-size distribution. Small beads increase the surface available for adhesion for a given weight portion of beads, thus tending to increase the strength of the formed part.

The beads of this invention should have a median particle size in the range 10–200 microns, and preferably in the range 10–100 microns. Bead size may be controlled by controlling the amount and type of stabilizing colloid used to maintain a stable dispersion, by controlling agitation during the polymerization in the range 0.001–0.01 HP/gal and by selection of a polyester mixture which is convenient to handle, especially having a viscosity desirably below 50 centipoises. The median size of the beads produced can be decreased and clumping averted by the incorporation of surfactants in the suspension mixture. Bead size may also be reduced by the adjustment of the pH so that the residual carboxyl grouPs of the polyester are partially neutralized, thus producing an in situ surfactant.

Hollow beads are undesirable in the formed product because they lead to flaws which cannot be removed by polishing. Hollow beads can be minimized by replacing the oxygen of the air in the suspension mixture with nitrogen at atmospheric pressure or under vacuum, and by carrying out the polymerization far from the boiling point of the polymerizing mixture.

Forming compositions typically will include about 40–70% of our beads, by weight, in a polyester or other thermoplastic or thermosetting matrix; for example, polymethylmethacrylate. The compositions may be cast into sheets as well as cured in 3-dimensional molds.

BEST MODE FOR CARRYING OUT THE INVENTION

In a general sense, our invention involves the steps of (a) preparing a suspension of unsaturated polyester in water, (b) optionally degassing the suspension, (c) subjecting the suspension to a positive pressure while mildly agitating it to maintain the suspension, (d) initiating polymerization, preferably at a temperature of between about 30°–70° C., allowing polymerization to proceed at a temperature which may increase between 30° and 70° C.

The polymerized substantially spherical beads are easily separated from the suspension. If desired, they may then be washed.

In particular, our invention comprises the following steps:

(a) Preparing an aqueous suspension of unsaturated polyester resin, said resin being a partially reacted combination of dibasic acids or anhydrides and polyols with an acid number up to 75 and having a molecular weight from 750 to about 5000. The polyester portion of the resin composition may be from 15–80 percent by weight with the remainder a cross-linking monomer such as styrene or methyl methacrylate. Generally the styrene or methyl methacrylate will be present in a range from about 20 to about 1200 parts per 100 parts of dibasic acid component in the resin; preferably about 20 to about 300 parts. To maintain a good balance of adhesion of beads to the matrix in the later forming process, without excessive swelling of the beads during the forming operation, the polyester portion of the composition is preferably kept in the range 20–80 percent. The suspension is formed of about 15 to about 40 percent resin, preferably about 20% to 30%, in about 60–85 percent water (preferably deionized), in the presence of a small but effective amount (typically 0.2–1.0%) of a hydrophilic suspending agent stable in the pH range of 2–3. Examples of such hydrophilic suspending agents are polyvinyl alcohol, hydroxyethyl cellulose, starch, polymethacrylic acid, polyacrylic acid or their salts, polyacrylamide, polyethylene glycol ethers, hydrated silica, and aluminum silicate. Such suspending agents may sometimes be called colloidal suspending agents. Polymethacrylic acid is a useful and preferred suspending agent and is effective at concentrations in the range 0.2–1.0 percent of the water present.

(b) Maintaining the mean droplet size of the resin below about 200 microns, and preferably below about 100 microns, preferably with the bulk (at least 50% by weight) of the droplets between 10 and 100 microns. The pH is maintained in the range 2–7. To aid in maintaining a fine particle size, the pH may be adjusted to a value between 3 and 7 with NaOH. The free acid groups of the resin appear to act as an in situ emulsifier, materially reducing the particle size. An anionic emulsifying agent stable at low pH may also be employed. Examples are sodium dodecylbenzene sulfonate and sodium dihexyl sulfosuccinate.

(c) Optionally degassing the suspension by displacing the oxygen preferably with nitrogen at one atmosphere or less under a vacuum sufficient to cause boiling of the suspension mixture while stirring the suspension.

(d) Adding to the suspension an effective amount, generally about 0.05 percent to 1.0 percent of a polymerization initiator or mixture of free radical initiators to begin polymerization of the resin. The initiators are chosen from those which decompose with a thermal half-life of one hour or less during some portion of the polymerization. Initiators with low decomposition temperatures (i.e. with a one hour half-life at temperatures from about 40° C. to 100° C.) are desirable so that the polymerization will occur at a low temperature to avoid hollow bead formation. A mixture of initiators can be helpful so that free radical formation will continue in the higher temperature part of the cycle. Redox mixtures of initiators with reducing agents may be used; for example, mixtures of tertiary amines and benzoyl peroxide, and less preferably, methylethyl ketone peroxide and metal salts. After addition of the initiator, the temperature is elevated during the course of the polymerization starting in the range about 30°–70° C. and finishing in the range about 80°–120° C., maintaining a pressure (preferably under an inert gas) on the polymerizing suspension of at least 10 psig until the polymerization reaction is substantially complete. The pressure should be sufficient to suppress boiling during the whole reaction period.

The polymerized beads may be readily separated from the suspension by filtration or centrifugation.

Washing the beads will remove suspending and emulsifying agents, which may or may not have a discernable effect on adhesion.

In addition, our process contemplates the recycling of the aqueous suspending medium.

Suitable unsaturated dibasic acids or anhydrides containing polymerizable unsaturation are exemplified by maleic acid, maleic anhydride, fumaric acid, dimethyl maleic anhydride, and itaconic acid.

Examples of dibasic acids or anhydrides without polymerizable double bonds are phthalic acid, phthalic anhydride, isophthalic acid, terephthalic acid, azeleic acid, adipic acid, sebacic acid, pimelic acid, glutaric acid, succinic acid, succinic anhydride, and glutaric anhydride.

The dibasic acid component of the resin should comprise about 5–100% unsaturated (polymerizable, such as maleic acid or anhydride) preferably 5–30%, and the balance saturated (not polymerizable through an unsaturated linkage, such as phthalic anhydride).

Suitable glycols include ethylene glycol, propylene glycol, neopentyl glycol, diethylene glycol, polyoxy ethylene glycol, trimethylene glycol, tetra methylene glycol, penta methylene glycol, hexa methylene glycol, hepta methylene glycol; i.e. polyols having at least two hydroxyl groups.

Acid number is the number of milligrams of KOH required to neutralize 1 gram of resin. It is an indication of the number of free acid groups in the resin, and indirectly of its molecular weight. The resin should have an acid number in the range up to 75, preferably in the range 5–40, with molecular weight in the range approximately 750 to 5000.

Suitable initiators include benzoyl peroxide, 2,2' azobis isobutyronitrile, lauroyl peroxide, decanoyl peroxide, t-butyl peroctoate, t-butyl peroxy pivalate, alpha-cumyl peroxyneodecanoate, t-butyl peroxyneodecanoate, 2,2' azobis (2,4 dimethyl-4 methoxy valeronitrile), 2,2' azobis (2,4 dimethyl) pentane-nitrile, 2-(tert-butyl azo)4 methoxy-2,4 dimethyl pentane nitrile, t-butyl peroxybenzoate, and cumene hydroperoxide.

In the following experiments and examples, the incidence of hollow beads is measured by the following procedure:

A small but representative sample of dry beads is placed on a microscope slide with a spatula. Cover with sytrene containing about 0.5 percent 402E33 red dye. Cover with a cover glass and allow to soak for about 5 minutes. Take a 100× photograph of the beads through a microscope and count hollow beads as a percentage of total beads. Several hundred beads should be present on which to base a count, which usually requires two pictures.

CONTROL OF BEAD SIZE

The principal variable for control of bead size is the concentration of polyvinyl alcohol or other suspending agent such as low molecular weight polymethacrylic acid, but this variable is of limited effectiveness at and above 60% resin solids. The results of the recycle test indicate that it is possible to decrease the bead size by increasing suspending agent concentration at 30% solids. Other important variables affecting bead size are agitation, water/organic ratio in the suspension mixture, and resin solids.

The addition of anionic soap to the suspension mixture can be used to reduce bead size. Examples are sodium dodecyl benzene sulfonate ("Nacconol 90F"), and sodium dihexyl sulfosuccinate ("Aerosol MA"). Neutralization of the free acid of the polyester with NaOH produces an in situ soap which is also effective.

Our invention will be further described with reference to the following examples.

EXAMPLE 1

| Polyester Resin | Parts, by weight |
|---|---|
| Phthalic Anhydride | 29.88 |
| Maleic Anhydride | 8.48 |
| Propylene Glycol | 21.49 |
| Diethylene Glycol | 1.51 |
| Styrene | 38.64 |
| Viscosity | 200–250 centipoises |
| Suspension formulation (based on grams per 100 grams polyester resin charged) | |
| Polyester Resin (described above) | 100 |
| Water (deionized) | 207.1 |
| Polyvinyl Alcohol | 1.2 |
| Sodium Dodecyl Benzene Sulfonate | 0.2 |
| Alpha-Cumyl peroxyneodecanoate | 0.3 |
| Decanoyl Peroxide | 0.1 |

A 100-gallon reactor was charged with 52.3 gallons water and heated to 65° C., with agitation.

A suspension mixture of 8.4 gallons water, 2.93 lb polyvinyl alcohol, and sodium dodecylbenzene sulfonate (0.488 lb) was added at 60° C. during the heatup. The resin was added (244 lb) (agitator off) cooling the mixture to 60° C. Vacuum was applied with the agitator off; (22 in. Hg) for 30 minutes. The vacuum line was shut off and the agitator started at 50 rpm for 8 minutes. The vacuum was relieved by the addition of nitrogen, the peroxide initiators were added, the agitator speed increased to 125 rpm; the pH at this point was 2.4. A nitrogen pressure of 50 psig was applied to the reactor.

The temperature was maintained at 55° C. for 128 minutes, then heated to 90° C. in 45 minutes and maintained at 90° C. for 60 minutes.

After cooling, the beads were recovered by centrifuging on a 6-inch solid-bowl centrifuge and dried in trays at 50° C. for 48 hours. A portion of the wet beads was reslurried in its original volume of water before drying. Hollow beads: 2.6%, residual styrene: 0.57%. Swelling index 0.93.

| | Screen Analysis of Beads | |
|---|---|---|
| US Sieve No. | Sieve opening (mm) | % retained |
| 80 | 0.177 | 1.8 |
| 120 | 0.125 | 46.9 |
| 140 | 0.105 | 4.9 |
| 170 | 0.088 | 28.6 |
| 200 | 0.074 | 7.3 |
| 325 | 0.044 | 9.3 |
| Pan | — | 1.2 |

Fifty parts of the washed beads were molded with 50 parts of polyester resin to form a sink, employing 0.45 parts of cumyl peroxy neodecanoate in the matrix polyester (having the same composition as the bead resin), starting at 60° C., with a post-cure at 100° C. Molded objects were made with as much as 65% beads in the molding mixture. Adhesion between beads and matrix was marginal in all cases, but better with washed than unwashed beads; the relatively poor adhesion was attributed at least partially to the low swelling index.

EXAMPLE 2

An alternative system employing the same polYester resin as above but mixed with enough styrene (138.64 parts by weight instead of 38.64) to give a resin solids of about 30% to increase swelling was run with a more dilute suspension (300 gm water/100 gm polymerizables). The suspending agent was polyvinyl alcohol (0.6 gm/100 gm polymerizables). Degassing was by nitrogen purging at atmospheric pressure. Initiators were alpha-cumyl peroxyneodecanoate 0.3 gm/100 gm resin, t-butyl peroxypivalate 0.075 gm/100 gm resin, and decanoyl peroxide 0.1 gm/100 gm resin. A more rapid polymerization schedule was employed than in Example 1, nearly adiabatic, with heating from 60°–90° C. in 70 minutes and 90 minutes at 90° C. Final pH was 2.7. Reaction pressure was 12 psig. Work-up was by centrifugation on a solid-bowl centrifuge with washing by reslurrying in water, recentrifuging, and drying in trays at 50° C. Hollow beads were 1.4% of the total, a significant improvement over Example 1. Toluene insolubles were 82.6%, swelling index 2.69, residual sytrene 1.5%. Median bead size obtained photographically was 54 microns.

EXAMPLE 3

A batch similar to Example 2 was made but with a different initiator system (0.075 gm t-butyl peroxyneodeoanoate, 0.075 gm t-butyl peroxypivalate, 0.1 gm decanoyl peroxide/100 gm resin). The susPension was more concentrated (207 parts water/100 gm polymerizables). The temperature after adding initiators at 60° C. was increased to 90° C. over 48 minutes and maintained at 90° C. for 90 minutes. Hollow beads were 2.1% of the total. Toluene insolubles: 83.6%, swelling index 2.75, residual styrene 2.56%.

Median Bead Size was 87 microns. Sinks were cast from a mixture containing 45% by weight of the washed beads in polyester resin (see Matrix Resin Compositions A and B listed below) using 0.45% alpha-cumyl peroxyneodecanoate at an initiating temperature of 60° C. All sinks showed improved adhesion compared with the beads of Example 1, which had a lower swelling index and were larger.

| Matrix Resin Composition A | |
|---|---|
| Mole % | |
| Maleic Anhydride | 33 |
| Phthalic Anhydride | 67 |
| Glycols (mols/100 mols anhydrides) | |
| Diethylene glycol | 25 |
| Propylene glycol | 82 |
| Styrene = 28% by weight of composition | |

| Matrix Resin Composition B | |
|---|---|
| Mole % | |
| Maleic Anhydride | 35.5 |
| Phthalic Anhydride | 64.5 |
| Glycols (mols/100 mols anhydrides) | |
| Diethylene glycol | 23.6 |
| Propylene glycol | 83.9 |
| Styrene = 31.3% by weight of composition | |

EXAMPLE 4

On a laboratory scale it was demonstrated that the particle size could be controlled by adjusting the pH of the suspension with NaOH. The residual carbonyl groups of the polyester are partially neutralized, making the polyester more hydrophilic and producing an in situ surfactant.

| Resin (as in Example 2) | 100 |
|---|---|
| Deionized Water | 207 |
| Polyvinyl Alcohol | 0.3 |
| NaOH | 1.43 |
| pH Initial | 7.0 |
| t-Butyl Peroxypivalate | 0.075 |
| t-Butyl peroxyneodecanoate | 0.075 |
| Decanoyl Peroxide | 0.075 |
| Heating Cycle | 60–90° C. 60 min. |
| | At 90° C. 60 min. |

The pH was adjusted to 7.0 with NaOH before addition of initiators. A very fine dispersion was obtained with much swelling of the polymer. A very thick slurry of extremely small particles (1–10 microns) resulted. The solids were recovered by filtration and drying at 50° C. Attempts to use these solids in molding resulted in high viscosity dispersions at low bead concentrations. It was concluded that a PH of 7 or higher should not be employed.

Repetitions of the experiment using the resin of Example 1 with a slight reduction in the NaOH to adjust the pH, achieving a PH in the range of 5.3–6.2 resulted in considerably larger beads than recited above; in fact, it was possible to control the size of the beads produced by the amount of NaOH added, as may be seen in the following Table A, wherein the units are parts by weight.

TABLE A

| Batch | A | B | C | D | E | F* | G** | H |
|---|---|---|---|---|---|---|---|---|
| Resin+ | 100 | 100 | 100 | 100 | 100 | 100 | 100 | 100 |
| Water | 207 | 207 | 207 | 207 | 207 | 207 | 207 | 207 |
| PVA | 1.2 | 1.2 | 1.2 | 1.2 | 1.2 | 1.2 | 1.2 | 1.2 |
| NaOH | 1.0 | 1.0 | 1.14 | 1.14 | 1.29 | 1.29 | 1.29 | 1.29 |
| pH (initial) | 5.3 | 5.3 | 5.7 | 5.7 | 6.1 | 6.2 | 6.1 | 5.9 |
| (second) | | | | | 5.5 | 5.6 | 5.6 | 5.5 |
| Screen Analysis % Retained Sieve No.*** | | | | | | | | |
| 50 | 10.0 | 9.8 | 0.1 | 0.8 | 0.0 | 0.0 | | |
| 60 | 3.3 | 2.7 | 0.5 | 0.0 | 0.0 | 0.2 | | |
| 80 | 6.2 | 4.5 | 2.0 | 1.9 | 2.0 | 0.8 | 1.6 | 4.0 |
| 100 | 7.3 | 4.8 | 2.8 | 2.7 | 10.1 | 1.3 | 0.2 | 0.9 |
| 140 | | | | | | | 7.5 | 20.5 |
| 170 | | | | | | | 13.3 | 11.6 |
| 200 | 40.0 | 40.7 | 31.7 | 36.9 | 74.0 | 61.9 | 26.4 | 25.4 |
| 325 | 27.3 | 30.5 | 49.5 | 46.3 | 10.0 | 24.9 | 36.3 | 24.5 |
| Pan | 5.9 | 7.0 | 13.4 | 11.4 | 3.9 | 10.9 | 14.7 | 13.1 |

*Batch run at 10 psig to suppress formation of hollow beads.
**20 psig.
***Blank indicates sieve of that designation not used.
+The resin composition was the same as in the beads of Example 1.

Beads were recovered except as noted by decantation, washing with fresh water, filtration through cheesecloth, and drying in an air oven in trays for 24 hours. The dried beads caked to some extent on drying. Prior to use in the molding operation, the beads were screened through a No. 50 sieve to break up lumps and then the portion of the beads passing a No. 80 sieve was used as a filler to prepare filled polyester moldings.

Batch F was dried without filtration or washing. Very severe caking occurred with Batch F. A molding with poor adhesion of beads to matrix was obtained, indicating the desirability of at least some washing. The incidence of hollow beads was less when the reactor was run under positive pressure than when run at 0 psig. With washed beads from Batch G, better adhesion of beads to matrix resin was obtained in the moldings than with Batch F.

EXAMPLE 5

Use of a redox initiator system for low-temperature polymerization:

| | |
|---|---|
| Resin | 100 (parts by weight) |
| Water | 207 (parts by weight) |
| Polyvinyl Alcohol | 1.2 (parts by weight) |
| Sodium Dihexyl Sulfosuccinate | 0.37 (parts by weight) |
| Benzoyl Peroxide | 1.0 (parts by weight) |
| N—N Diethylaniline | 0.2 (parts by weight) |

The water and polyvinyl alcohol (in solution) were charged to the reactor at 30° C., the resin and diethylaniline were added followed by the benzoyl peroxide (in styrene). The reactor was purged with nitrogen for 15 minutes, pressurized to 5 psig. The pressure was increased in 5 psig increments to 30 psig over a 3-hour time interval. After 4 hours, 50 minutes, at 30° C., the batch was heated to 90° C. over 40 minutes and maintained at 90° C. for 60 minutes. Beads were recovered by centrifugation and dried at 50° C.

Hollow beads were 0.3%, toluene insolubles 86.5%, swelling index 1.22, residual styrene 0.55%, and median bead size 105 microns.

EXAMPLE 6

Polymethacrylic acid as suspending agent:

| | |
|---|---|
| Polyester Resin | |
| Diethylene Glycol | 30.7 (% by weight) |
| Phthalic Anhydride | 31.9 (% by weight) |
| Maleic Anhydride | 7.0 (% by weight) |
| Styrene | 30.4 (% by weight) |
| Formulation | |
| Resin (above) | 100 (parts by weight) |
| Water | 300 (parts by weight) |
| Polymethacrylic Acid | 1.0 (parts by weight) |
| Decanol Peroxide | 0.1 (parts by weight) |
| Alpha-Cumyl Peroxy-neodecanoate | 0.45 (parts by weight) |
| t-Butyl Peroxypivalate | 0.075 (parts by weight) |

A mixture of water and polymethacrylic acid was heated to 60° C., the resin and initiators were added, the mixture was purged with nitrogen, and polymerization was conducted at atmospheric pressure by heating from 60° to 90° C. over 35 minutes and holding at 90° C. for 60 minutes. Beads with a median size of 130 microns were obtained, with 0.3% hollow beads.

Table B may be interpreted to show the effect of different polyvinyl alcohol levels on the median size of the beads; however, the effect is not a clear demonstration because all other factors are not held constant.

TABLE B

Polyester Beads - Pilot-Plant Batches
Reactor: 100-Gallon

| Batch | L | M | N | O | P | Q | R |
|---|---|---|---|---|---|---|---|
| Resin (as in Ex. 1) | 100 | 100 | 100 | 100 | 50 | 50 | 50 |
| Styrene | 0 | 0 | 0 | 0 | 50 | 50 | 50 |
| Resin Solids, % | 60 | 60 | 60 | 60 | 30 | 30 | 30 |
| Lupersol 10M75 | 0.1 | 0.1 | 0.1 | 0 | 0.1 | 0.1 | 0 |
| Lupersol 11 | 0.1 | 0.1 | 0.1 | 0 | 0.1 | 0.1 | 0.1 |
| Lupersol 188M75 | 0 | 0 | 0 | 0.4 | 0 | 0 | 0.4 |
| Decanox F | 0.1 | 0.1 | 0.1 | 0.1 | 0.1 | 0.1 | 0.1 |
| Water | 207 | 207 | 207 | 207 | 207 | 300 | 300 |
| Polyvinyl Alcohol Elvanol 50-42 | 0.6 | 0.6 | 0.6 | 1.2 | 0.6 | 0.876 | 0.876 |
| Nacconol 90F | 0 | 0 | 0 | 0.2 | 0 | 0 | 0 |
| Degas | No | No | No | Vac at 58° C. | No | No | No |
| Cycle | | | | | | | |
| Temp, °C. | 70 | 60–90 | 60–90 | 55 | 60–90 | 60–90 | 60–90 |
| Time, min | 105 | 45 | 48 | 68 | 48 | 123 | 70 |
| Temp, °C. | 70–90 | | | 55–90 | | | |
| Time, min | 60 | | | 45 | | | |
| Temp, °C. | 90 | 90 | 90 | 90 | 90 | 90 | 90 |
| Time, min | 60 | 60 | 60 | 60 | 90 | 90 | 90 |
| Pressure, psig | 10 | 10 | 10 | 50 | 12 | 12 | 12 |
| Workup | Screen | Basket Cent | Solid Bowl | Solid Bowl | | | |
| Wash | On Screen | | | Reslurry | | | |
| Dry | 50 | 50 | 50 | 50 | 50 | 50 | 50 |
| Size Median | | | | | | | |
| Photo | | | | | 87 | 83 | 54 |
| Screen | 130 | 130 | | 127 | | | |
| Hollow Beads, % | 3.0 | 8.3 | 2.2 | 2.6 | 2.1 | 1.7 | 1.4 |
| Toluene Insols | | | | 94.4 | 83.6 | 87.3 | 82.6 |
| Swelling Index | | | | 0.93 | 2.75 | 2.81 | 2.69 |
| Residual Styrene | | | | | | | |
| wet cake | | | | 3.83 | | 2.46 | 3.16 |
| dry beads | | | | 0.57 | 2.56 | 1.25 | 1.54 |

TABLE C

Polyester Beads - Lab Batches

| Batch | S | T | U | V | W | X | Y | Z |
|---|---|---|---|---|---|---|---|---|
| Resin** | 100 | 100 | 100 | 83.3 | 66.7 | 50 | 50 | 25 |
| Styrene | 0 | 0 | 0 | 16.7 | 33.3 | 50 | 50 | 75 |
| Resin Solids, % | 60 | 60 | 60 | 50 | 40 | 30 | 30 | 15 |
| Lupersol 11 | 0 | 0 | 0 | 0.1 | 0.1 | 0.1 | 0.1 | 0.1 |
| Lupersol 188M75 | 0.4 | 0.4 | 0 | 0.4 | 0.4 | 0.4 | 0 | 0 |
| Decanox F | 0.1 | 0.1 | 0 | 0.1 | 0.1 | 0.1 | 0.1 | 0.1 |

TABLE C-continued

| Batch | Polyester Beads - Lab Batches | | | | | | | |
|---|---|---|---|---|---|---|---|---|
| | S | T | U | V | W | X | Y | Z |
| Lupersol 10M75 | 0 | 0 | 0 | 0 | 0 | 0 | 0.1 | 0.1 |
| Benzoyl Peroxide | 0 | 0 | 1.0 | 0 | 0 | 0 | 0 | 0.1 |
| NN Diethylaniline | 0 | 0 | 0.2 | 0 | 0 | 0 | 0 | 0 |
| Water | 207 | 207 | 207 | 300 | 300 | 300 | 207 | 207 |
| Polyvinyl Alcohol | 1.2 | 1.2 | 1.2 | 0.88 | 0.88 | 0.88 | 0.60 | 0.60 |
| Nacconol 90F | 0.2 | 0.2 | 0 | 0 | 0 | 0 | 0 | 0 |
| Aerosol MA80 | 0 | 0 | 0.46 | 0 | 0 | 0 | 0 | 0 |
| Cycle | | | | | | | | |
| Temp, °C. | 60 | 60 | 30 | 60-90 | 60-90 | 60-90 | 60-90 | 60-90 |
| Time, min | 125 | 140 | 280 | 60 | 60 | 60 | 60 | 60 |
| Temp, °C. | 60-90 | 60-90 | 60-90 | 90 | 90 | 90 | 90 | 90 |
| Time, min | 60 | 40 | 50 | 90 | 90 | 90 | 90 | 60 |
| Temp, °C. | 90 | 90 | 90 | | | | | 90-100 |
| Time | 60 | 60 | 60 | | | | | |
| Pressure, psig | 0 | 30 | 5-30 | 10 | 10 | 10 | 10 | 10 |
| Workup | Centrifuge Solid Bowl | | | | | | Filter | Filter |
| Dry | 50° C. Air Oven | | | | | | | |
| Bead Size, micr | 74* | 91* | 105 | 100 | 103 | 43 | 58 | — |
| Hollow Beads, % | 0.9 | 0.8 | 0.3 | 0.5 | 0.4 | 0.1 | 0.8 | — |
| Toluene Insols | | 84.9 | 86.5 | 83.7 | 84.6 | 84.8 | 84.2 | 87.6 |
| Swelling Index | | 1.26 | 1.22 | 1.90 | 2.10 | 2.70 | 2.87 | 3.76 |

*By screen analysis.
**(as in Example 1)
Lupersol 11 - t-butyl peroxypivalate (all 75% solutions)
Lupersol 10M75 - t-butyl peroxyneodecanoate (all 75% solutions)
Lupersol 188M75 - alpha-cumyl peroxyneodecanoate (all 75% solutions)
Nacconol 90F - Na dodecyl benzene sulfonate
Aerosol MA80 - Na dihexyl sulfosuccinate, 80%

EXAMPLE 7

A series of 2-liter runs was made to determine whether the process water could be recycled, as outlined in Table D. The batches were made using the resin composition of Example 1, with 207.1 parts of deionized water as suspension medium per 100 parts of resin. The initiators used were t-butyl peroxypivalate 0.075 parts, t-butyl peroxyneodecanoate 0.075 parts, and decanoyl peroxide 0.1 parts/100 parts of resin. The batches were heated from 60°-90° C. in 60 minutes and held at 90° C. for 60 minutes. All of the filtrate from these batches (noted as 1-5 in the recycle sequence) was recycled to the next batch with makeup of fresh water to keep the suspension composition constant. The polyvinyl alcohol was added to the initial batch at 0.6 parts/100 parts of resin, and makeup polyvinyl alcohol added in proportion to the makeup water as shown in Table D except in the sixth batch in the recycle sequence where more polyvinyl alcohol was added (95% of the original charge). Results indicated no difficulty with suspension stability, no increase in the acidity of the process water, but some increase in bead size. The increase in bead size was reversible by adding an amount of PVA nearly equivalent to the original charge. The solids content in the filtrate increased from about 1% to about 4%, and appeared to be levelling out at that level. With more efficient recovery of filtrate and a lower percentage of fresh water, a somewhat higher level might be expected.

EXAMPLE 8

Use of methyl methacrylate as a cross-linking agent:

| | | |
|---|---|---|
| Resin (as in Ex. 1) | 50 | 50 (contains 38.64% styrene) |
| Styrene | 36 | 22 |
| Methyl methacrylate | 14 | 28 |
| Decanox F | .1 | .1 |
| Lupersol 11 | .1 | .1 |
| LuPersol 188M75 | 0.6 | 0.6 |
| Water | 300 | 300 |
| Polymethacrylic acid | 2.0 | 2.0 |

The reactor was charged with water, polymethacrylic acid, heated to 60° C., before charging a mixture containing resin, monomers, and initiators. Then it was purged with nitrogen and maintained at 10 psig. The reaction mixture was heated to 90° C. in 45 minutes and maintained at 90° C. for 60 minutes before cooling and recovery of the beads by filtration. Beads of 20-150 microns were obtained.

TABLE D

| Batch | Recycle Test Suspension Polyesters | | | | | | | |
|---|---|---|---|---|---|---|---|---|
| | AA | BB | CC | DD | EE | FF | GG** | HH |
| Fresh Water, % | 100 | 12.2 | 41.3 | 38.2 | 29.4 | 47.5 | 100 | 100 |
| PVA, % of Original | 100 | 12.2 | 41.3 | 38.2 | 29.4 | 95 | 100 | 100 |
| Recycle Sequence | 1 | 2 | 3 | 4 | 5 | 6 | 1 | 1 |
| pH Initial | 2.2 | 2.2 | 2.2 | 2.3 | 2.2 | 2.4 | 2.2 | 2.4 |
| % Moisture (wet cake) | — | 39.7 | 38.6 | 21.9 | 43.5 | 34.9 | 24.6 | 40.8 |
| % Solids Effluent | 0.84* | 1.7* | — | 3.6 | 4.3 | 4.1 | 1.1 | 0.86 |
| Screen Analysis | | | | | | | | |
| +50 | | 6.3 | 27.5 | 16.2 | 9.5 | 10.9 | 9.6 | 3.7 | 8.5 |
| 60 | | 9.4 | 44.7 | 21.6 | 14.8 | 16.9 | 12.4 | 6.4 | 11.8 |
| 80 | | 14.4 | 67.9 | 31.5 | 25.7 | 30.3 | 16.6 | 10.4 | 16.6 |
| 100 | | 19.0 | 78.2 | 40.1 | 36.2 | 44.4 | 20.5 | 13.7 | 20.1 |
| 200 | | 90.2 | 97.8 | 91.7 | 91.2 | 93.8 | 78.6 | 83.8 | 39.4 |
| 325 | | 96.1 | 99.3 | 97.4 | 97.6 | 98.0 | 92.7 | 94.8 | 82.9 |

TABLE D-continued

| Batch | Recycle Test Suspension Polyesters | | | | | | | |
|---|---|---|---|---|---|---|---|---|
| | AA | BB | CC | DD | EE | FF | GG** | HH |
| −325 | 100.0 | 100.0 | 100.0 | 100.0 | 100.0 | 100.0 | 100.0 | 100.0 |

*Filtration performed with filter paper; subsequent filtrations done with cheesecloth.
**Neville Island water; all other runs made with deionized water.

A second recycle study (Table E) was run in the laboratory reactor using the procedure of Example 2. The amount of polyvinyl alcohol added in each of the recycle batches was the same as in the original, thus resulting in a build-up of PVA concentration. In this series of six runs, the bead size decreased from 43 microns to 26 microns, while the solids in the effluent increased from 3.3 to 6.5%. Clearly, makeup of the polyvinyl alcohol in proportion to the make-up water (as in Example 7) is a better procedure.

The second procedure (Table E) led to a buildup of polyvinyl alcohol. It is interesting that at the high polyvinyl alcohol levels of this study extremely small beads were produced. (Increasing the polyvinyl alcohol concentration is not effective in decreasing bead size at a resin solids level of 60%).

TABLE E

| Recycle Data - Polyester Beads Chemco Data | | | | | | |
|---|---|---|---|---|---|---|
| Batch No. | 95 | 90 | 99 | 100 | 102 | 103 |
| No. in Series | 1 | 2 | 3 | 4 | 5 | 6 |
| % Fresh Water Added | 100 | 6.2 | 28.7 | 33.7 | 17.2 | 16.3 |
| % PVA Added* | | | | | | |
| on water | | | ← 0.29 → | | | |
| on resin | | | ← 0.874 → | | | |
| Med Bead Size, microns | 43 | 42 | 33 | 34 | 24 | 26 |
| % Hollow Beads | 0.10 | 0.24 | 0.43 | 0.35 | 0.45 | 0.33 |
| % Solids in Effluent | 3.3 | 2.0 | 3.3 | 4.3 | 5.1 | 6.5 |

*100% of original charge with no recycle added to all batches.

We claim:
1. Method of making polyester resin beads suitable for use as a solid component in a filled molding matrix and having a swelling index of about 1 to about 3, comprising:
    (A) preparing an aqueous suspension of (a) unsaturated polyester resin, said resin being a composition comprising (i) about 100 parts by weight of a dibasic acid component comprising from about 5 to about 100 mole percent dibasic acid or anhydride thereof having a polymerizable double bond and up to 95 parts by weight dibasic acid or anhydride not having polymerizable double bonds, and (ii) about 100 to about 120 parts by weight of a glycol or polyol having at least two hydroxyl groups, and (b) about 20 to about 1200 parts per 100 parts of dibasic acid component by weight of a cross-linking monoethylenically unsaturated monomer,
    said polyester resin having an acid number in the range of about 5 to about 40 and having an average molecular weight between about 750 and 5000,
    said suspension being formed in the presence of an amount of a hydrophilic suspending agent effective to form said suspension;
    (B) maintaining the mean droplet size of the resin suspension below about 200 microns by maintaining a pH of greater than 2 but less than 7 and adding an anionic emulsifying agent in an amount up to about 0.3 percent based on the suspension water;
    (C) adding to the suspension an effective amount of a polymerization initiator, mixing the suspension, and elevating the temperature of the suspension to begin polymerization of the resin, and
    (D) maintaining a pressure on the polymerizing suspension of up to 50 psig until the polymerization reaction is substantially complete.
2. Method of claim 1 where the hydrophilic suspending agent is polymethacrylic acid.
3. Method of claim 1 where the hydrophilic suspending agent is polymethacrylic acid.
4. Method of claim 1 including the step prior to beginning of polymerization, of degassing the suspension by displacing the oxygen with nitrogen or another inert gas at one atmosphere or less.
5. Method of claim 1 wherein the pressure is maintained under an inert gas.
6. Method of claim 1 wherein the suspension is formed from about 20 to about 30 percent resin in about 70–80 percent (by weight) water.
7. Method of claim 1 wherein the pressure in step (d) is maintained at about 10 to about 50 psig.
8. Method of claim 1 wherein the pH is maintained between about 3 and less than 7 by the addition of NaOH.
9. Method of claim 1 wherein the anionic emulsifying agent is sodium dodecyl benzene sulfonate.
10. Method of claim 1 wherein the unsaturated dibasic acid component comprises about 5–30% of the resin composition.
11. Method of claim 1 wherein the hydrophilic suspending agent is present in an amount from about 0.2–1.0% of the water.
12. Method of claim 1 wherein the suspension comprises about 15–40% resin and about 60–85% water.
13. A method of making polyester resin beads according to claim 1 wherein about 20 to about 300 parts per 100 parts of dibasic acid component by weight of a cross-linking monoethylenically unsaturated monomer is used.
14. A method of making polyester resin beads according to claim 1 wherein the polyester portion of the suspension composition ranges from 20 to 80%.
15. A method of making polyester resin beads according to claim 1 wherein the acid number of the polyester resin ranges from 5 to 40.
16. Method of claim 1 wherein the cross-linking monomer is styrene.
17. Method of claim 1 wherein the cross-linking monomer is methyl methacrylate.
18. Method of claim 1 wherein the cross-linking monomer is vinyl toluene.
19. Resin in bead form made by a method of claim 1.
20. Resin in bead form made by a method of claim 6.
21. Resin in bead form made by a method of claim 1 having an incidence of hollow beads less than 3%.

* * * * *

UNITED STATES PATENT AND TRADEMARK OFFICE
CERTIFICATE OF CORRECTION

PATENT NO. : 4,983,668

DATED : 1/8/91

INVENTOR(S) : Louis A. Cutter, Richard A. Ganger and John J. Godfrey

It is certified that error appears in the above-identified patent and that said Letters Patent is hereby corrected as shown below:

Column 2, line 65, "grouPs" should be -- groups --.
Column 7, line 12, "ExamPle" should be -- Example --.
Column 14, line 19, claim 2, change "polymethacrylic acid"
to --polyvinyl alcohol--.

Signed and Sealed this

Sixteenth Day of June, 1992

Attest:

DOUGLAS B. COMER

Attesting Officer

Acting Commissioner of Patents and Trademarks